United States Patent [19]
Fleig et al.

[11] Patent Number: 5,349,434
[45] Date of Patent: Sep. 20, 1994

[54] METHOD OF MEASURING ARTIFACT TAPER

[75] Inventors: Jon F. Fleig, Rochester, N.Y.; Mark J. Tronolone, Fairport, N.Y.; Chunsheng J. Huang, San Jose, Calif.

[73] Assignee: Tropel Corporation, Fairport, N.Y.

[21] Appl. No.: 36,454

[22] Filed: Mar. 24, 1993

[51] Int. Cl.$^5$ ............... G01B 11/26; G01C 1/00; G01F 23/00
[52] U.S. Cl. ................ 356/138; 356/371; 356/147; 250/358.1
[58] Field of Search ............ 356/371, 355, 356, 357, 356/358, 153, 147, 373, 138; 250/358.1

Primary Examiner—Rolf Hille
Assistant Examiner—David B. Hardy
Attorney, Agent, or Firm—Eugene Stephens & Associates

[57] ABSTRACT

An interferometer (14) performs three topographical measures of an artifact (12) to determine taper between opposing surfaces (50 and 52) of the artifact (12) mounted on three points of support (30, 32, and 34). Two sets of three data points (60, 62, and 64 and 68, 70, and 72) are extracted from the first topographical measure and are used to calculate irregularities in one of the opposing surfaces (50). The second two topographical measures are made of the other artifact surface (52). Taper between the opposing surfaces (50 and 52) is calculated independently of both the surface irregularities and any angular deviations of the three points of support (30, 32, and 34).

27 Claims, 3 Drawing Sheets

METHOD OF MEASURING ARTIFACT TAPER

FIELD OF INVENTION

The invention relates to the field of metrology and, in particular, to the use of flatness measuring instruments for measuring first order thickness variations or "taper" between opposite side surfaces of artifacts.

BACKGROUND

Interferometers are commonly used for measuring surface flatness. Fringe patterns of interferograms are interpreted to produce detailed topographical maps of artifact surfaces. The detailed topographical information can be further processed to yield first order characteristics of the measured surfaces, including overall position and orientation.

For example, a single interferogram can be interpreted to produce relative measures of thickness variations, such as taper, in transparent artifacts having opposite side surfaces that are optically smooth and nearly parallel. Deformable artifacts can be pressed against a reference surface for determining taper by comparing a measure of an opposing side surface to the reference surface.

However, separate measures of opposite side surfaces are required to measure taper of many artifacts, especially rigid artifacts that are opaque or rough or have nonparallel measurement surfaces. The opposite side surfaces of such artifacts can be separately measured by alternately mounting the opposite side surfaces in a freestanding state (e.g., on a three-point stand). Taper is calculated by comparing the relative orientations of the opposite side surfaces.

We have encountered two problems with making such freestanding measurements of artifact taper on three-point stands. First, irregularities in artifact surfaces mounted on the three-point stands can introduce errors into the measurements. Second, angular deviations in the positions of the three-point stands from assumed reference positions cause further errors. Although it is possible to eliminate these latter-mentioned errors by accurately calibrating the positions of the three-point stands, such calibrations can be difficult and time consuming and are not practical when it is necessary to frequently adjust the three-point stands to accommodate different size or shape artifacts.

SUMMARY OF INVENTION

Our invention involves a new method of measuring taper between two surfaces of an artifact that is supported in a free state. The new method is especially useful for measuring rigid artifacts having nonparallel or irregular surfaces. A unique combination of measures is used to reduce measurement errors caused by such surface irregularities and by variations in the angular orientation of supports that are used to position the artifacts for measurement.

For example, the invention provides for positioning a first of two opposing artifact surfaces on three points of support. A first topographical measure is made of a second of the opposing artifact surfaces, and a first plane is fit to the data. In addition, two sets of three data points are extracted from the first topographical measure for locating second and third planes. First and second angular orientations of the second and third planes are determined with respect to the first plane.

The artifact is then inverted, and the first set of three points on the second surface of the artifact is aligned with the three points of support. A second topographical measure is made of the first surface, and a fourth plane is fit to the data, defining a third angular orientation. The artifact is then rotated by 180 degrees into a position that aligns the second set of three surface points with the three points of support. A third topographical measure is made of the first surface, and a fifth plane is fit to the data, defining a fourth angular orientation. The first, second, third, and fourth angular orientations are combined in a calculation for determining a fifth angular orientation, representing an amount of taper between the first and second surfaces of the artifact.

The two sets of three data points are used to reference the location of the second surface of the artifact with respect to the three points of support and to discount irregularities in the second surface. The two topographical measures of the first surface of the artifact are used to discount variations in the angular orientation of the three points of support. Together, the three topographical measures, including the extraction of data points from one of the topographical measures, provide sufficient information to accurately measure taper of artifacts having irregular surfaces without requiring the angular orientation of the three points of support to be aligned with an axis of measurement.

DRAWINGS

DETAILED DESCRIPTION

Figure 1:
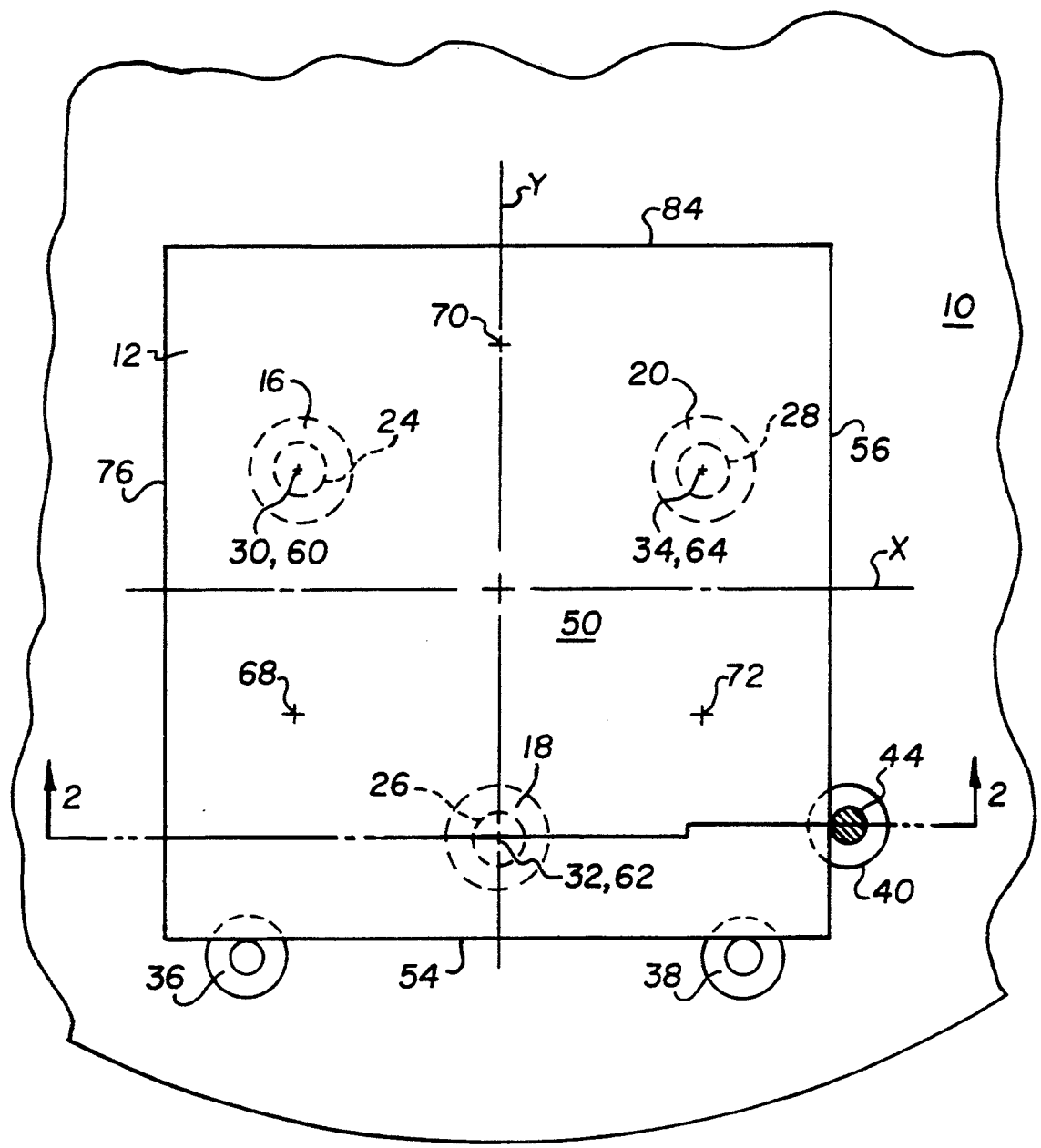
FIG. 1 is a plan view taken along line 1—1 of FIG. 2 showing an artifact mounted on three support pins and located by three guide pins.
Figure 2:
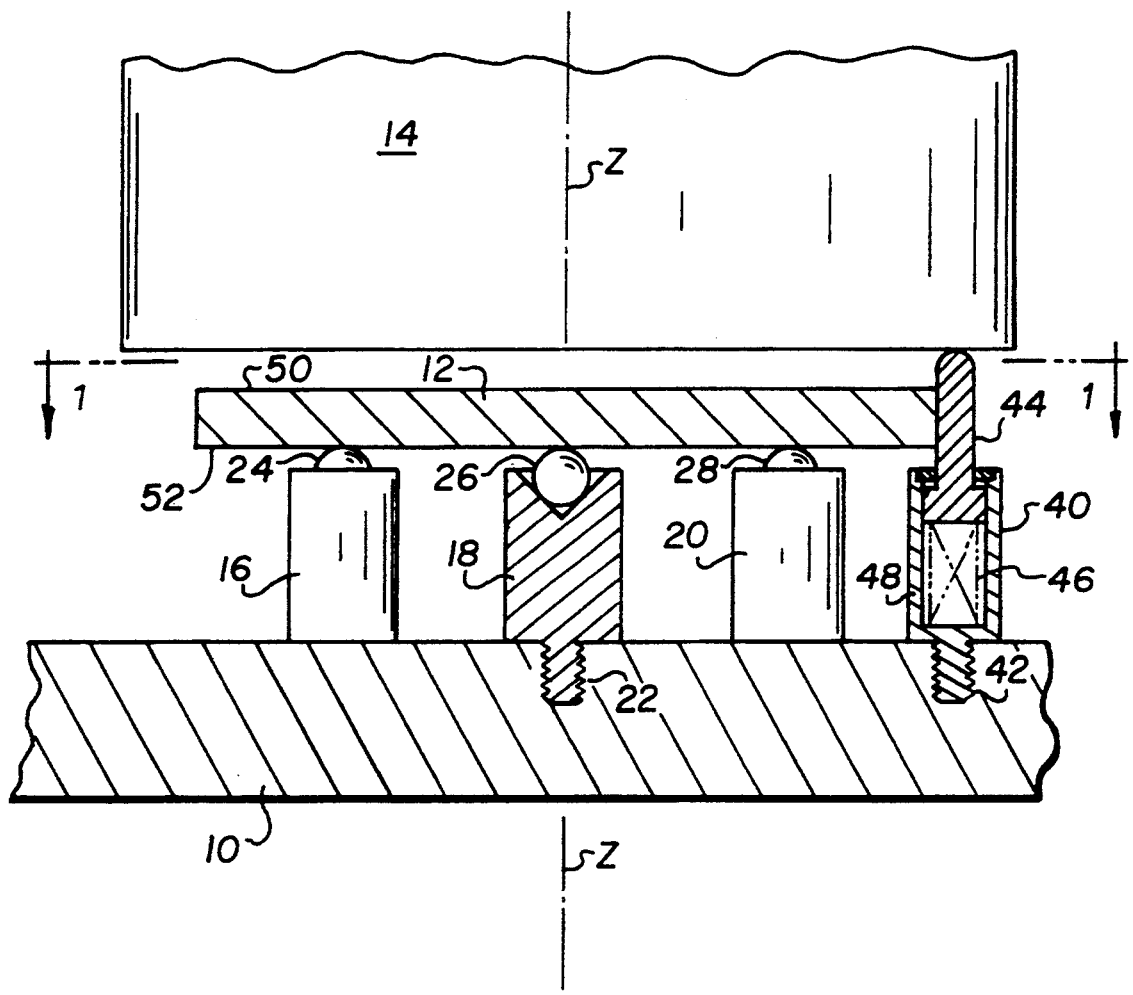
FIG. 2 is a cross-sectional side view taken along line 2—2 of FIG. 1 showing the artifact positioned for measurement by an interferometer.

Our invention can be practiced with conventional flatness measuring instruments such as depicted in FIGS. 1 and 2. A platter 10, which is only partly shown, can be shaped to provide support for one or more rigid artifacts 12 (such as ceramic wafers) in predetermined positions with respect to an interferometer 14. Conventional rotating and translating mechanisms (not shown) can be connected to the platter 10 for moving the artifact 12 between a loading position and a measuring position.

Three support pins 16, 18, and 20 position the artifact along a "Z" axis of a cartesian coordinate system. Threaded portions, such as the threaded portion 22 of support pin 18, attach the support pins 16, 18, and 20 to the platter 10. Sapphire spheres 24, 26, and 28 are mounted within recesses of the support pins for providing three points of support 30, 32, and 34 on the artifact 12.

The three support points of support 30, 32, and 34 are located with respect to the artifact in positions that minimize distortions of the artifact due to its own weight. A conventional finite element analysis program can be used to determine optimum positions of the three points of support 30, 32, and 34. However, for square artifacts, the three points of support 30, 32, and 34 can be located in equiangular positions on radii that extend about one-third of the length of the artifact sides.

The artifact 12 is located within an X-Y plane of the cartesian coordinate system by three guide pins 36, 38, and 40. Similar to the support pins 16, 18, and 20, the guide pins 36, 38, and 40 are threaded into the platter 10. For example, the guide pin 40 has a threaded portion 42 that is engaged with mating threads of a bore in the platter 10.

The guide pins 36, 38, and 40 also include, as exemplified by guide pin 40, a sliding post 44 engaged with a spring 46 within a retainer 48. The sliding post 44, which locates the artifact 12, is urged by the spring 46 in a direction above the platter 10 to a height that is limited by the interferometer 14. The variable heights of the sliding posts accommodate variations in artifact thickness without interfering with the desired measuring position of the interferometer 14. The three guide pins 36, 38, and 40, together with the three support pins 16, 18, and 20, can be threaded into different mounting positions on the platter 10 to accommodate different size and shape artifacts.

The artifact 12 is positioned for performing a first topographical measure of a surface 50 of the artifact 12 by placing an opposing surface 52 of the artifact on the three support pins 16, 18, and 20 as shown in FIGS. 1 and 2. The artifact 12 is adjusted in the X-Y coordinate plane to abut a side 54 of the artifact with the guide pins 36 and 38 and to abut an adjacent side 56 of the artifact with the guide pin 40. The interferometer 14 produces a topographical measure of the surface 50, which can be digitized into an array of distinct points located in the cartesian coordinate system.

Figure 3:
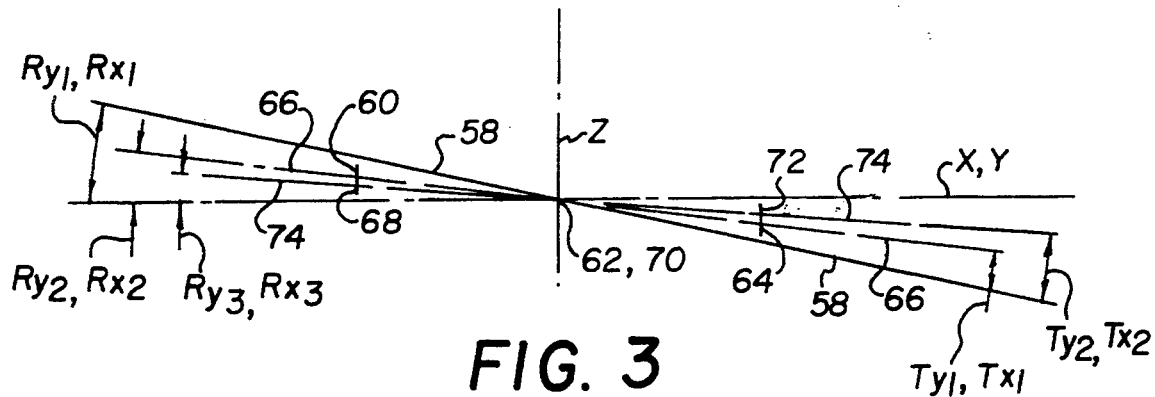
FIG. 3 is a diagram showing relationships between three planes associated with a first topographical measure of an artifact surface.
Figure 4:
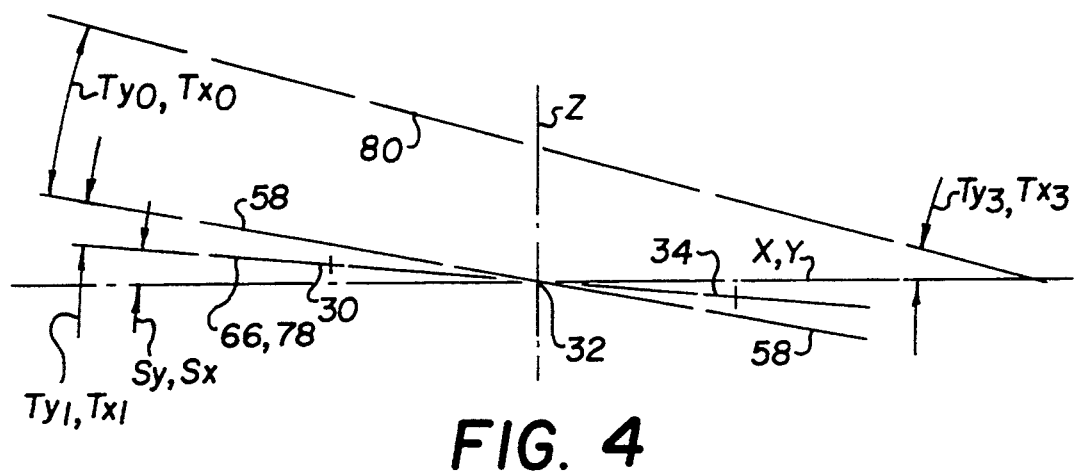
FIG. 4 is a diagram showing relationships between two of the three planes of FIG. 3 and a fourth plane associated with a second topographical measure of an opposing artifact surface.
Figure 5:
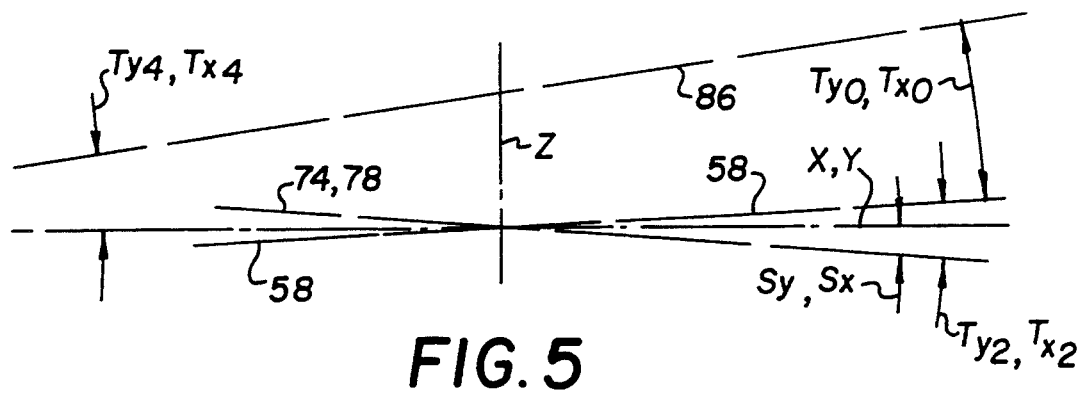
FIG. 5 is a diagram showing relationships between two other of the three planes of FIG. 3 and a fifth plane associated with a third topographical measure of the opposing artifact surface.

With reference to FIG. 3, a plane 58 is fit to the digitized data of the topographical measure to best approximate the position and orientation of the surface 50. Well-known mathematical techniques, such as the "method of least squares" can be used to calculate the plane 58. The angular orientation of the plane 58 is defined within the coordinate system by respective angular measures $R_{x1}$ and $R_{y1}$ taken about the X and Y axes. FIGS. 3–5 reference these and other angular measures in alternative coordinate planes. The "y" subscripted angular measures are referenced in an X-Z coordinate plane, and the "x" subscripted angular measures are referenced in a Y-Z coordinate plane. In addition, although angular measures are depicted herein as angles, the angular measures can also be represented as slopes to simplify calculations.

A first set of data points 60, 62, and 64 (see FIG. 1) is extracted from the digitized data, corresponding to first predetermined locations of the three points of support 30, 32, and 34 in the X-Y coordinate plane. Using well-known mathematical techniques, a plane 66 is defined through the first set of data points 60, 62, and 64. The plane 66 is oriented within the coordinate system by respective angular measures $R_{x2}$ and $R_{y2}$ about the X and Y axes.

A second set of data points 68, 70, and 72 (see FIG. 1) is also extracted from the digitized data of surface 50, corresponding to second predetermined locations of the three points of support 30, 32, and 34 relatively rotated with respect to the artifact 12 about the Z axis through 180 degrees. A plane 74 is defined through the second set of data points 68, 70, and 72 having respective angular measures $R_{x3}$ and $R_{y2}$ about the X and Y axes.

The angular measures $R_{x1}$, $R_{y1}$, $R_{x2}$, $R_{y2}$, $R_{x3}$, and $R_{y3}$ have limited value as independent measures of the artifact surface 50, because the measures are affected by both irregularities in the opposing surface 52 and angular deviations in the positions of the three points of support 30, 32, and 34. However, relative angular measures between the planes 58, 66, and 74 are not affected by these irregularities and deviations. For instance, the relative angular orientation of the plane 66 with respect to the plane 58 can be determined as follows:

$$T_{x1} = R_{x1} - R_{x2} \quad (1)$$

$$T_{y1} = R_{y1} - R_{y2} \quad (2)$$

where $T_{x1}$ is the angular difference between planes 58 and 66 about the X coordinate axis and $T_{y1}$ is the angular difference between planes 58 and 66 about the Y coordinate axis.

Similarly, the angular orientation of the plane 74 with respect to the plane 58 can be determined as follows:

$$T_{x2} = R_{x1} - R_{x3} \quad (3)$$

$$T_{y2} = R_{y1} - R_{y3} \quad (4)$$

where $T_{x2}$ is the angular difference between planes 58 and 74 about the X coordinate axis and $T_{y2}$ is the angular difference between planes 58 and 74 about the Y coordinate axis.

The artifact 12 is repositioned for performing a second topographical measure, this time on the surface 52, by rotating the artifact about the Y coordinate axis through 180 degrees. The inverted artifact is adjusted in the X-Y coordinate plane to maintain the side 54 of the artifact against the guide pins 36 and 38 and to abut another adjacent side 76 of the artifact against the guide pin 40. This adjustment aligns the positions of the first set of data points 60, 62, and 64 with the points of support 34, 32, and 30, respectively.

FIG. 4 shows the location of a plane 78 including the three points of support 30, 32, and 34 with respect to both the X-Y coordinate plane and the plane 58, representing the best fit of the surface 50. The plane 78, which is coincident with the plane 66 through the first set of data points, is inclined with respect to the X-Y coordinate plane through orthogonal angles $S_x$ and $S_y$, representing angular deviations of the three points of support about the respective coordinate axes X and Y. The previously calculated angles $T_{x1}$ and $T_{y1}$ represent angular differences between the planes 58 and 78 about the same coordinate axes.

An array of distinct points digitized from the second topographical measure is processed for determining a plane 80 that best fits the data. The plane 80 is respectively inclined about the coordinate axes X and Y by angles $T_{x3}$ and $T_{y3}$. Each of the angles $T_{x3}$ and $T_{y3}$ can be expressed as the sum of three component angles having regard to their sign as follows:

$$T_{x3} = S_x - T_{x0} - T_{x1} \quad (5)$$

$$T_{y3} = S_y + T_{y0} + T_{y1} \quad (6)$$

where $T_{x0}$ and $T_{y0}$ are angular differences between the planes 58 and 80 about the respective X and Y coordinate axes, representing measures of taper between the opposite side surfaces 50 and 52 of the artifact. However, the angles $S_x$, $S_y$, $T_{x0}$, and $T_{y0}$ remain unknown.

A third topographical measure is made after rotating the artifact through 180 degrees about the Z coordinate axis. The rotated artifact is adjusted in the X-Y coordinate plane to abut a remaining side 84 of the artifact against the guide pins 36 and 38 and to abut the adjacent side 56 against the guide pin 40. This positions the second set of data points 68, 70, and 72 in alignment with the points of support 30, 32, and 34, respectively, and locates the plane 74 through the second set of data points coincident with the plane 78 through the three points of support as shown in FIG. 5.

From the third topographical measure, a plane 86 is calculated as the best fit of an array of digitized points. The plane 86 is respectively inclined about the coordinate axes X and Y by angles $T_{x4}$ and $T_{y4}$. Similar to the angles $T_{x3}$ and $T_{y3}$, the angles $T_{x4}$ and $T_{y4}$ can also be expressed as the sum of three component angles having regard to their sign as follows:

$$T_{x4} = S_x + T_{x0} + T_{x2} \quad (7)$$

$$T_{y4} = S_y - T_{y0} - T_{y2} \quad (8)$$

where $T_{x0}$ and $T_{y0}$ also represent angular differences between the planes 58 and 86 about the respective X and Y coordinate axes equivalent to the angular differences between the planes 58 and 80.

The four equations for $T_{x3}$, $T_{y3}$, $T_{x4}$, and $T_{y4}$ provide sufficient information to solve for the four remaining unknowns $S_x$, $S_y$, $T_{x0}$, and $T_{y0}$. For example, the angular deviations $S_x$ and $S_y$ of the three points of support can be solved as follows:

$$S_x = \tfrac{1}{2}(T_{x4} + T_{x3} + T_{x1} - T_{x2}) \quad (9)$$

$$S_y = \tfrac{1}{2}(T_{y4} + T_{y3} + T_{y2} - T_{y1}) \quad (10)$$

The same terms can be rewritten to solve for the angular differences $T_{x0}$ and $T_{y0}$ as follows:

$$T_{x0} = \tfrac{1}{2}(T_{x4} - T_{x3} - T_{x2} - T_{x1}) \quad (11)$$

$$T_{y0} = \tfrac{1}{2}(t_{y3} - T_{y4} - T_{y2} - T_{y1}) \quad (12)$$

Since $T_{x0}$ and $T_{y0}$ represent angular differences between the best fit planes of artifact surfaces 50 and 52, the angular differences $T_{x0}$ and $T_{y0}$ also represent measures of first order thickness variation or taper between the artifact surfaces. Thus, the three topographical measures can be used to determine taper between the artifact surfaces 50 and 52.

However, once the angular deviations $S_x$ and $S_y$ of the three points of support have been determined, only two topographical measures are required to determine the taper of subsequent artifacts mounted on the same three points of support. For example, the angular differences $T_{x0}$ and $T_{y0}$ can be calculated by rewriting equations (5) and (6) as follows:

$$T_{x0} = S_x - T_{x3} - T_{x1} \quad (13)$$

$$T_{y0} = T_{y3} - S_y - T_{y1} \quad (14)$$

Although the invention has been illustrated as a method of measuring taper of square-shaped artifacts, other shapes can also be measured. For example, round artifacts can be measured by locating the artifact using just two of the guide pins 36, 38, and 40. The rotational position of the round artifact can be referenced to either of the remaining pins or the platter 10.

The first order measure of thickness variation, determined in accordance with the present invention, also provides a basis for determining higher order thickness variations by relatively orienting the topographical measures of the opposing artifact surfaces.

We claim:

1. A method of measuring taper between two surfaces of an artifact comprising steps of:

measuring a first surface of the artifact;

calculating a first angular orientation of a first plane passing through a first set of three points on said first surface;

calculating a second angular orientation of a second plane passing through a second set of three points on said first surface;

inverting said artifact;

aligning said first set of three points with three points of support;

measuring a second surface of the artifact;

calculating a third angular orientation of said second surface;

rotating said artifact;

aligning said second set of three points with said three points of support;

remeasuring said second surface of the artifact;

calculating a fourth angular orientation of said second surface; and combining said first, second, third, and fourth angular orientations in a calculation for determining a fifth angular orientation between said first and second surfaces.

2. The method of claim 1 in which said three points of support are located at a sixth angular orientation, said first surface is located at a seventh angular orientation, and said first and second angular orientations are measured with respect to said seventh angular orientation.

3. The method of claim 2 in which said third angular orientation is equal to a sum of said first, fifth, and sixth angular orientations.

4. The method of claim 3 in which said fourth angular orientation is equal to a sum of said second, fifth, and sixth angular orientations.

5. The method of claim 1 in which said steps of measuring the first and second surfaces include taking measurements along a first axis in positions referenced by second and third axes.

6. The method of claim 5 in which said step of inverting said artifact includes rotating said artifact about one of said second and third axes through an angle of approximately 180 degrees.

7. The method of claim 6 in which said step of rotating said artifact includes rotating said artifact about said first axis through an angle of approximately 180 degrees.

8. The method of claim 5 in which each of said first, second, third, and fourth angular orientations include respective angular components measured about said second and third axes.

9. The method of claim 8 in which said step of combining said first, second, third, and fourth angular orientations in a calculation includes determining respective angular components of said fifth angular orientation about said second and third axes.

10. The method of claim 9 in which said respective angular components of said fifth angular orientation are determined in accordance with the following equations:

$$T_{x0} = \tfrac{1}{2}(T_{x4} - T_{x3} - T_{x2} - T_{x1})$$

$$T_{y0} = \tfrac{1}{2}(T_{y3} - T_{y4} - T_{y2} - T_{y1})$$

where $T_{x1}$ and $T_{y1}$ are respective angular components of said first angular orientation, $T_{x2}$ and $T_{y2}$ are respective angular components of said second angular orientation, $T_{x3}$ and $T_{y3}$ are respective angular components of said third angular orientation, $T_{x4}$ and $T_{y4}$ are respective angular components of said fourth angular orientation, and $T_{x0}$ and $T_{y0}$ are respective angular components of said fifth angular orientation corresponding to an amount of taper between said first and second surfaces.

11. The method of claim 1 in which said three points of support are located at a sixth angular orientation.

12. The method of claim 11 further comprising the step of combining said first, second, third, and fourth angular orientations in a calculation for determining said sixth angular orientation.

13. The method of claim 12 further comprising the step of determining the fifth angular orientation between the first and second surfaces of subsequent artifacts by combining said first, second, third, and sixth angular orientations.

14. A method of using an interferometer to measure a taper between two surfaces of an artifact supported in a free state comprising steps of:
placing a first surface of the artifact on three support pins;
obtaining a first topographical measure of a second surface of the artifact with the interferometer;
extracting individual measures of a first set of three points of data from said first topographical measure corresponding to first predetermined locations on said second surface;
extracting individual measures of a second set of three points of data from said first topographical measure corresponding to second predetermined locations on said second surface;
placing said second surface of the artifact on said three support pins in a position that aligns said first predetermined locations on the second surface with the support pins;
obtaining a second topographical measure of said first surface of the artifact with the interferometer;
placing said second surface of the artifact on said three support pins in a position that aligns said second predetermined locations on the second surface with the support pins;
obtaining a third topographical measure of said first surface of the artifact with the interferometer; and
calculating an amount of taper between said first and second surfaces of the artifact based on said first, second, and third topographical measures.

15. The method of claim 14 including the further step of fitting a first plane to said first topographical measure of the second surface.

16. The method of claim 15 including the further steps of fitting a second plane to said first set of three data points and calculating a first angular orientation between said first and second planes.

17. The method of claim 16 including the further steps of fitting a third plane to said second set of three data points and calculating a second angular orientation between said first and third planes.

18. The method of claim 17 including the further steps of fitting a fourth plane to said second topographical measure of the first surface, fitting a fifth plane to said third topographical measure of the first surface, and calculating a third angular orientation between said fourth and fifth planes.

19. The method of claim 18 in which said step of calculating an amount of taper between said first and second surfaces of the artifact includes relating said first and second angular orientations to said third angular orientation for determining said amount of taper between said first and second surfaces.

20. The method of claim 14 in which said first, second, and third topographical measures are made in a direction along a first of three orthogonal axes.

21. The method of claim 20 including the further step of rotating the artifact about said first axis for moving the artifact from the position that aligns said first predetermined locations on the second surface with the support pins to the position that aligns said second predetermined locations on the second surface with the support pins.

22. The method of claim 21 in which said artifact is rotated through 180 degrees about said first axis between said two positions of alignment.

23. The method of claim 21 in which a perimeter of said artifact is abutted against two locating pins for positioning the artifact along a second and third of said three orthogonal axes.

24. The method of claim 23 in which said first and second predetermined locations are referenced with respect to said locating pins.

25. The method of claim 20 in which said three support pins define a plane for supporting the artifact.

26. The method of claim 25 including the further step of calculating an inclination of said plane defined by the support pins with respect to a second and third of said orthogonal axes based on said first, second, and third topographical measures.

27. The method of claim 26 including the further step of calculating an amount of taper between said first and second surfaces of another artifact based solely on said first and second topographical measures.

* * * * *